Aug. 8, 1950          W. B. BREWER          2,518,277
OVERHEAT PROTECTOR FOR HEATED WINDSHIELDS
Filed Aug. 6, 1947
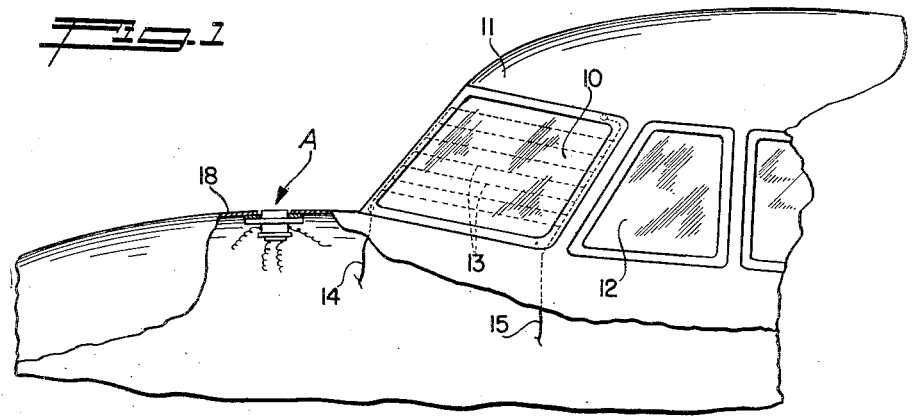
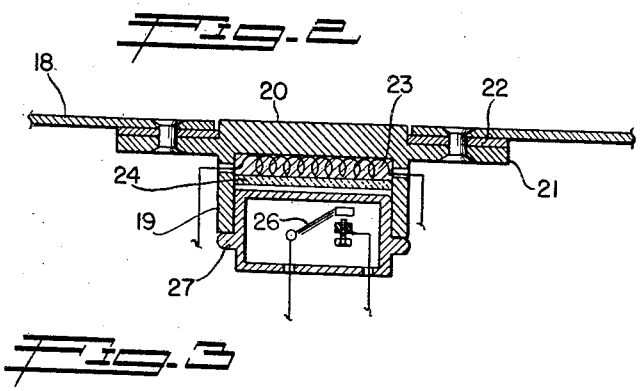
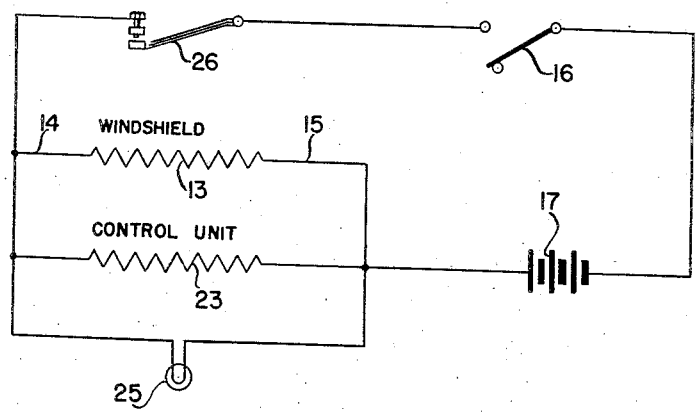
INVENTOR
WARD B. BREWER
By *George C. Sullivan*
Agent Patented Aug. 8, 1950

2,518,277

UNITED STATES PATENT OFFICE 2,518,277

OVERHEAT PROTECTOR FOR HEATED WINDSHIELDS

Ward B. Brewer, Glendale, Calif., assignor to Lockheed Aircraft Corporation, Burbank, Calif.

Application August 6, 1947, Serial No. 766,641

1 Claim. (Cl. 219—19)

This invention relates to preventing inadvertent overheating of windshields and the like which are provided with heating means for preventing the formation or removing accumulations of ice thereon.

Windshields, particularly for aircraft, are subject to ice accumulations both on the ground and in flight and heating thereof, to melt the ice, is desirable practice. However, such windshields are normally made as glass sandwiches bonded together with a tough thermoplastic resin interlayer of the acrylate type. Because the preferable types of interlayer materials are thermoplastic, inadvertent overheating of such laminated windshields is apt to cause localized melting or bubbling of the interlayer material, permanently destroying the optical usefulness thereof. Heating methods heretofore in use include hot air distributed over the inner surface or between spaced layers of a double glazed windshield, wires embedded in the interlayer material and heated by an electric current, and electrically conductive thin transparent coatings on the glass that for my purposes may be considered as equivalent to an infinite number of fine wires overlying or embedded in the glass laminate.

It has also been proposed to embed a convolute of wire in such glass laminates, which wire is incorporated as one arm of a bridge circuit in an attempt to measure the temperature developed in the convolute of wire. The various disadvantages of such an arrangement include serious manufacturing problems encountered in placing such a wire insert in an exposed area of the glass laminate, involves the use of delicate electrical measuring instruments in the bridge circuit, the wire can not be replaced, repaired, or adjusted when once built into the glass laminate, and the wire must be tailored to each individual windshield location, size, heating wire pattern, and exposure, since it must be electrically insulated from the heating wires and responds only to the heat transmitted thereto through the glass laminate from the localized hot spots created by the heating wires.

It is known that the embedded heating wires used in the types of windshields described can not exceed a temperature of 200° F. without causing softening and/or bubbling of the plastic near the wires. Such softening or bubbling permanently ruins the entire windshield since the optical distortions produced thereby interfere with the pilot's vision and at the least render the otherwise invisible heating wires very prominent in the field of vision. This maximum temperature of 200° F. may occur before the surface temperature of the glass panel reaches a temperature of 90° F. It will, therefore, be evident that to inadvertently turn on the heat when the windshield temperature is much above the freezing point risks rather prompt and lasting damage to the windshield. It is accordingly an object of this invention to provide an improved and simplified control for a windshield heating system of the class described wherein the control responds to a predetermined exposed surface temperature in the order of 40° F. to 50° F. to prevent operation of the heating system above such surface temperatures.

It will be understood in this connection that the heat dissipation from the exposed surface of the windshield will vary over wide limits, from a high loss in flight to a low loss or even gain on the ground, so that it is a further object of this invention to provide a control of the type described that will embody a thermal capacity analogous to that of the windshield to be protected so that when the control unit is exposed to approximately the same type of air flow and atmospheric conditions as the controlled equipment, a thermostat will open a heater circuit at a safe temperature and will reclose the circuit when icing conditions again appear.

It is also an object of this invention to provide a protector or control unit for heated windshields or the like that can be mounted and exposed separately from the windshield and will therefore be replaceable and adjustable without disturbing or replacing the windshield itself.

It is also an object of this invention to provide a protector or control unit of the type and for the purposes described that can be used to control various similar types of windshield heaters on different airplanes without requiring the tailoring of the control unit to each specific installation.

Other objects and features of the invention will be readily understood from the following detailed description of typical preferred forms of the invention wherein reference will be made to the accompanying drawings in which:

I have chosen to illustrate the use of my invention in connection with an airplane windshield heated by means of embedded wires, as shown in Figure 1;

Figure 2 is an enlarged section in diagrammatic form of my protector unit as mounted in the skin of an airplane; and Figure 3 is a wiring diagram of the heating and protecting circuits of my invention.

Where windshield deicing arrangements are used in airplanes, it is customary to confine such equipment to forwardly facing panels as indicated at 10 in Figure 1, where a portion of an airplane fuselage 11 is shown. It is not so essential to heat the side windows 12 although they can also be heated if desired. While the windshields may be heated in a number of ways, the present invention relates to a protective control of such heating and I have chosen to illustrate my control as applied to a windshield having a plurality of fine heating wires 13 embedded in the interlayer of the laminated glass panel. These heating wires 13 are arranged in parallel and are connected in parallel to common electrical connections 14 and 15 also embedded in the interlayer at the margins of the glass panel. As heretofore used these connections form a circuit through a manual control switch 16 and the electrical system of the airplane as represented by a battery 17.

My invention contemplates the insertion in the aforesaid circuit of a control unit generally indicated by A in Figure 1. This control unit is desirably mounted in the skin 18 of the airplane in a location exposed to substantially the same type of airflow and atmospheric conditions as the windshields which it controls, it being understood that the unit may simultaneously control one or more separate windshield panels, as the conditions of the particular airplane installation may require.

The unit A comprises a well-like chamber resembling an inverted cup 19, the outer surface of the bottom 20 of which is mounted flush with the surface of the airplane skin through a suitable aperture by means of a mounting flange 21 surrounding the cup, the flange being heat insulated from the skin by a gasket 22. The mass of the cup and/or thickness of the cup bottom 20 is so chosen as to have a thermal capacity, insulated from the airplane skin 18, such that in combination with a heater coil 23 the rate of rise of temperature of the exposed surface of the control unit is the same as that of the windshield surface to be protected. The heater coil 23 is also chosen to match the thermal capacity of the control surface, so that these two variables are dependent on each other, and a wide range of combinations are possible, the thermal capacity being increased or decreased as a function of the heat delivery from the heater coil 23 in order to produce an overall result matching the rate of temperature rise in the windshield surface. The latter variable is dependent on variations in glass and interlayer materials and thickness, and the electrical energy supplied to the heating wires 13 embedded therein.

The heater coil 23 is desirably cemented in place against the inside of the cup bottom and is overlaid with heat insulation 24 to prevent dissipation of heat to the interior of the cup.

The heater coil 23 is connected in parallel with the windshield heating wires 13 as shown in Figure 3, and a pilot's indicating lamp 25 may also be connected in parallel with both heaters to warn the pilot that the heating circuit is closed.

An adjustable thermostatic switch 26 is mounted in a container 27 in heat transferring relationship to the walls of the cup 19 and connected in series with the manual switch 16. Thus when the temperature of the cup walls reaches a chosen maximum the thermostatic switch opens to open the heating circuit, and when the switch 26 closes due to a drop in temperature it energizes both heating systems if the manual switch 16 is closed.

In practice, I have found that windshield heating is desirable as the outer surface temperature of the windshield drops to approximately 35° F. Commercially available thermostatic switches have some spread between the opening and closing temperatures. For example the Paul Henry Company, Model C-01 thermoswitch that I have used, if set to close at a surface temperature of 35° F. will not open until the surface temperature rises to approximately 47° F., a spread of approximately 12° F. This spread is well within the permissible limits, as a surface temperature in the windshield of 47° F. will not result in damage to the interlayer, as I have found that the heating wires 13 can produce a surface temperature of approximately 80° F. on the ground without localized overheating of the interlayer adjacent the wires 13. Since it is obviously very easy to attain such a surface temperature in still air the use of a thermostat cutting out below 50° F. prevents turning on the heat under ground conditions wherein the windshield is already so warm that any added heat would quickly damage the windshield interlayer in the event a high ambient air temperature prevented rapid dissipation of such heat.

It should be noted in this connection that under ground or still air conditions the heat transmission or heat dissipation from the surfaces of the windshield and control unit represent a low-loss condition wherein the rate of temperature rise is determined by the heat capacity of the windshield and the control unit. In cold climates an airplane may gather a coating of ice or snow while standing and it will be desirable to melt such coating by the operation of the heating system. If the heat capacity of the control unit is approximately matched to that of the windshield controlled thereby the thermostatic switch 26 can adequately and safely control the heating circuit under such conditions, even though the embedded wire types of heated windshields have very little margin available to withstand localized overheating adjacent the wires. Under such static conditions the exact location and exposure of the control unit is not so critical as is the case where high-loss conditions result from flight under icing atmospheric conditions. High loss or rapid heat dissipation then results from the high air velocities flowing over the windshield and control unit surface, so that the control unit location should be chosen to expose it to substantially the same type of airflow and atmospheric conditions as the windshield which it controls.

By way of example, an embedded wire type of windshield was arranged to receive heat at the rate of two watts per square inch of surface. The resistance of the control unit heater wire 23 was so chosen that under steady state conditions heat would be supplied to the exposed bottom 20 of the cup at the same rate as heat reached the surface of the windshield. In the specific example the heater 23 was rated at 5.5 watts. Under these condtions, and with equal exposure, the surface temperature of the unit and of the windshield will be the same, and with equivalent heat capacity in the windshield and control unit the rate of temperature rise of the control unit will be the same as that in the windshield, so that the thermostat switch 26 can be set to close the heating circuits when the surface temperature of the control unit falls to the icing temperature of 35° F. The actual operating temperatures at the thermostat itself will naturally be higher than at the exposed surface but the difference will be a function of the heat capacity and heat dissipation from the surface of the control unit, which factors match those of the windshield to be protected.

It will thus be seen that I have provided a windshield heater protector that can be remotely disposed relative to the windshield to be protected, yet that will have the same initial rate of rise of surface temperature as the windshield and that will have heat supplied to the surface of the protector at the same rate as it reaches the surface of the windshield; thus producing comparable temperatures in the protector and windshield.

Having thus described my invention and the present preferred embodiments thereof, I desire to emphasize the fact that many modifications may be resorted to in a manner limited only by a just interpretation of the following claim.

I claim:

An overheat protector for electrically heated windshields and the like, comprising a remotely positioned protector unit, said unit including an inverted cuplike member, the bottom of which is exposed to substantially the same type of airflow and atmospheric conditions as the windshield which it protects, said cup-like member having a thermal capacity such that the rate of temperature change in the exposed part of said member substantially matches that of the windshield to be protected, heating means in said cup-like member adapted to produce a temperature rate of change in said member substantially matching that in said windshield, a thermostatic switch in said cup-like member, and a circuit including said windshield and heating means with said switch whereby said switch controls both the windshield and the heating means in response to varying temperatures in said cup-like member.

WARD B. BREWER.

REFERENCES CITED

The following references are of record in the file of this patent:

UNITED STATES PATENTS

| Number | Name | Date |
|---|---|---|
| 1,781,244 | Oswald | Nov. 11, 1930 |
| 1,900,831 | Marter | Mar. 7, 1933 |
| 2,006,006 | Zaiger | June 25, 1935 |
| 2,065,844 | Wattles | Dec. 29, 1936 |
| 2,146,604 | Taylor | Feb. 7, 1939 |
| 2,195,958 | Kearsley | Apr. 2, 1940 |
| 2,429,420 | McMaster | Oct. 21, 1947 |

FOREIGN PATENTS

| Number | Country | Date |
|---|---|---|
| 221,480 | Great Britain | Feb. 19, 1925 |